US011563858B1

(12) United States Patent
Rosen et al.

(10) Patent No.: US 11,563,858 B1
(45) Date of Patent: *Jan. 24, 2023

(54) SYSTEM, METHOD, AND COMPUTER PROGRAM FOR GENERATING INSIGHTS FROM HOME NETWORK ROUTER DATA

(71) Applicant: Amdocs Development Limited, Limassol (CY)

(72) Inventors: Gil Rosen, Tel Mond (IL); Eytan Kabilou, Kadima (IL); Amir Lapid, Givatayim (IL); Vivi Miranda, Raanana (IL); Ilan Levy, Herzeliya (IL); Gilli Shama, Ra'anana (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

This patent is subject to a terminal disclaimer.

(21) Appl. No.: 16/925,211

(22) Filed: Jul. 9, 2020

(51) Int. Cl.
*H04M 5/00* (2006.01)
*H04L 12/28* (2006.01)
*H04W 4/24* (2018.01)
*H04M 7/00* (2006.01)
*H04W 4/33* (2018.01)
*H04L 67/54* (2022.01)
(Continued)

(52) U.S. Cl.
CPC ........ *H04M 15/58* (2013.01); *H04L 12/2816* (2013.01); *H04L 12/2827* (2013.01); *H04L 67/535* (2022.05); *H04L 67/54* (2022.05); *H04M 7/0069* (2013.01); *H04W 4/24* (2013.01); *H04W 4/33* (2018.02)

(58) Field of Classification Search
CPC . H04M 15/58; H04M 7/0069; H04L 12/2827; H04L 12/2816; H04L 67/24; H04L 67/22; H04L 67/535; H04L 67/54; H04W 4/24; H04W 4/33
See application file for complete search history.

(56) References Cited

U.S. PATENT DOCUMENTS 7,050,555 B2   5/2006  Zargham et al.
7,698,163 B2   4/2010  Reed et al.
(Continued)

FOREIGN PATENT DOCUMENTS

CN    101902378 A   12/2010
CN    101299694 B    4/2012
(Continued)

OTHER PUBLICATIONS

Zhou, "Understanding Home Networks with Lightweight Privacy-Preserving Passive Measurement", 2016, UKnowledge, Theses and Dissertations—Computer Science, 135 pages. (Year: 2016).*

(Continued)

*Primary Examiner* — Arvin Eskandarnia
*Assistant Examiner* — Chhian (Amy) Ling
(74) *Attorney, Agent, or Firm* — Zilka-Kotab, P.C.

(57) ABSTRACT

As described herein, a system, method, and computer program are provided for generating insights from home network router data. In use, network usage/connection data is collected from a home network router operating in a residential space. Additionally, the network usage/connection data is processed to generate insights for the network usage/connection data. Further, the insights are output for display to one or more users.

20 Claims, 7 Drawing Sheets

(51) Int. Cl.
*H04L 67/50* (2022.01)
*H04M 15/00* (2006.01)

(56) References Cited

U.S. PATENT DOCUMENTS

| | | | |
|---|---|---|---|
| 9,584,335 B1 | 2/2017 | Malasani | |
| 9,819,610 B1 | 11/2017 | Crump et al. | |
| 10,448,204 B2 | 10/2019 | Maloney et al. | |
| 10,536,345 B2 | 1/2020 | Jacobson et al. | |
| 2007/0147247 A1 | 6/2007 | Kalonji et al. | |
| 2008/0082386 A1 | 4/2008 | Cunningham et al. | |
| 2010/0262467 A1* | 10/2010 | Barnhill, Jr. | H04L 41/12 709/223 |
| 2014/0327555 A1* | 11/2014 | Sager | G08B 13/19684 340/870.16 |
| 2015/0347536 A1* | 12/2015 | Smith | H04L 65/403 707/722 |
| 2016/0344873 A1* | 11/2016 | Jenzeh | H04M 15/866 |
| 2017/0264501 A1* | 9/2017 | Mathen | H04L 41/16 |
| 2018/0040011 A1 | 2/2018 | Milton | |
| 2018/0102032 A1 | 4/2018 | Emmanuel et al. | |
| 2018/0165431 A1* | 6/2018 | Neumann | G06F 21/44 |
| 2018/0165936 A1* | 6/2018 | Smith | G06F 11/3013 |
| 2018/0183684 A1 | 6/2018 | Jacobson et al. | |
| 2018/0212837 A1 | 7/2018 | Kallur et al. | |
| 2018/0288567 A1 | 10/2018 | Maloney et al. | |
| 2018/0316571 A1* | 11/2018 | Andrade | G06Q 10/06398 |
| 2019/0014381 A1 | 1/2019 | Tidwell et al. | |
| 2019/0095478 A1* | 3/2019 | Tankersley | G06F 16/2379 |
| 2019/0097909 A1* | 3/2019 | Puri | H04L 43/16 |
| 2019/0190848 A1 | 6/2019 | Zavesky et al. | |
| 2019/0363943 A1 | 11/2019 | De Angelis et al. | |
| 2020/0019365 A1 | 1/2020 | Spooner | |
| 2020/0104874 A1* | 4/2020 | Chintakindi | G06Q 30/0239 |
| 2020/0210393 A1 | 7/2020 | Beaver et al. | |
| 2021/0199326 A1 | 7/2021 | Venkatesh et al. | |
| 2021/0199328 A1 | 7/2021 | Venkatesh et al. | |
| 2022/0012630 A1 | 1/2022 | Rosen et al. | |
| 2022/0012631 A1 | 1/2022 | Rosen et al. | |

FOREIGN PATENT DOCUMENTS

| | | | |
|---|---|---|---|
| CN | 104504598 A | 4/2015 | |
| CN | 103458059 B | 4/2018 | |
| CN | 105657073 B | 7/2019 | |
| EP | 3457635 A1 | 3/2019 | |
| WO | 2016077613 A1 | 5/2016 | |
| WO | 2017087285 A1 | 5/2017 | |

OTHER PUBLICATIONS

Rosen et al., U.S. Appl. No. 16/925,187, filed Jul. 9, 2020.
Rosen et al., U.S. Appl. No. 16/925,199, filed Jul. 9, 2020.
Rosen et al., U.S. Appl. No. 16/925,203, filed Jul. 9, 2020.
Martin et al., "User-Driven Dynamic Traffic Prioritization for Home Networks," W-MUST'12, Aug. 2012, pp. 19-23.
Bozkurt et al., "Contextual Router: Advancing Experience Oriented Networking to the Home," SOSR'16, Mar. 2016, 7 pages.
Gharakheili et al., "Personalizing the Home Network Experience using Cloud-Based SDN," ResearchGate, Jan. 2014, 7 pages, retrieved from https://www.researchgate.net/publication/312978882_Personalizing_the_home_network_experience_using_cloud-based_SDN.
Fung, B., "How stores use your phone's WiFi to track your shopping habits," The Washington Post, Oct. 19, 2013, 7 pages, retrieved from https://www.washingtonpost.com/news/the-switch/wp/2013/10/19/how-stores-use-your-phones-wifi-to-track-your-shopping-habits/.
Bakhshi et al., "User-Centric Traffic Optimization in Residential Software Defined Networks," IEEE 23rd International Conference on Telecommunications (ICT), 2016, 6 pages.
International Search Report and Written Opinion from PCT Application No. PCT/IB2021/056149, dated Sep. 23, 2021.
Non-Final Office Action from U.S. Appl. No. 16/925,199, dated Jan. 19, 2022.
International Search Report and Written Opinion from PCT Application No. PCT/IB2021/056148, dated Oct. 12, 2021.
Final Office Action from U.S. Appl. No. 16/925,199, dated Jun. 15, 2022.
Sunny et al., "Residential Energy Management: A Machine Learning Perspective," IEEE Green Technologies Conference, Apr. 2020, pp. 229-234.
Non-Final Office Action from U.S. Appl. No. 16/925,187, dated Jul. 14, 2022.
Non-Final Office Action from U.S. Appl. No. 16/925,203, dated Aug. 12, 2022.
Advisory Action from U.S. Appl. No. 16/925,199, dated Aug. 31, 2022.

\* cited by examiner

SYSTEM, METHOD, AND COMPUTER PROGRAM FOR GENERATING INSIGHTS FROM HOME NETWORK ROUTER DATA

FIELD OF THE INVENTION

The present invention relates to generating insights related to network usage by users.

BACKGROUND

In the realm of network usage, insights refer to an understanding of the network usage in terms of various parameters such as location, time, bandwidth, etc. These insights are typically generated from a vast amount of network usage data collected across a network of a particular network provider, and are generally used by a network provider to identify poorly functioning areas of the network to improve performance of those areas. Thus, to date, systems for collecting network usage data and generating insights therefrom have been specifically configured for the large scale purpose of analyzing the network performance as a whole.

There is thus a need for addressing these and/or other issues associated with the prior art.

SUMMARY

As described herein, a system, method, and computer program are provided for generating insights from home network router data. In use, network usage/connection data is collected from a home network router operating in a residential space. Additionally, the network usage/connection data is processed to generate insights for the network usage/connection data. Further, the insights are output for display to one or more users.

DETAILED DESCRIPTION

Figure 1:
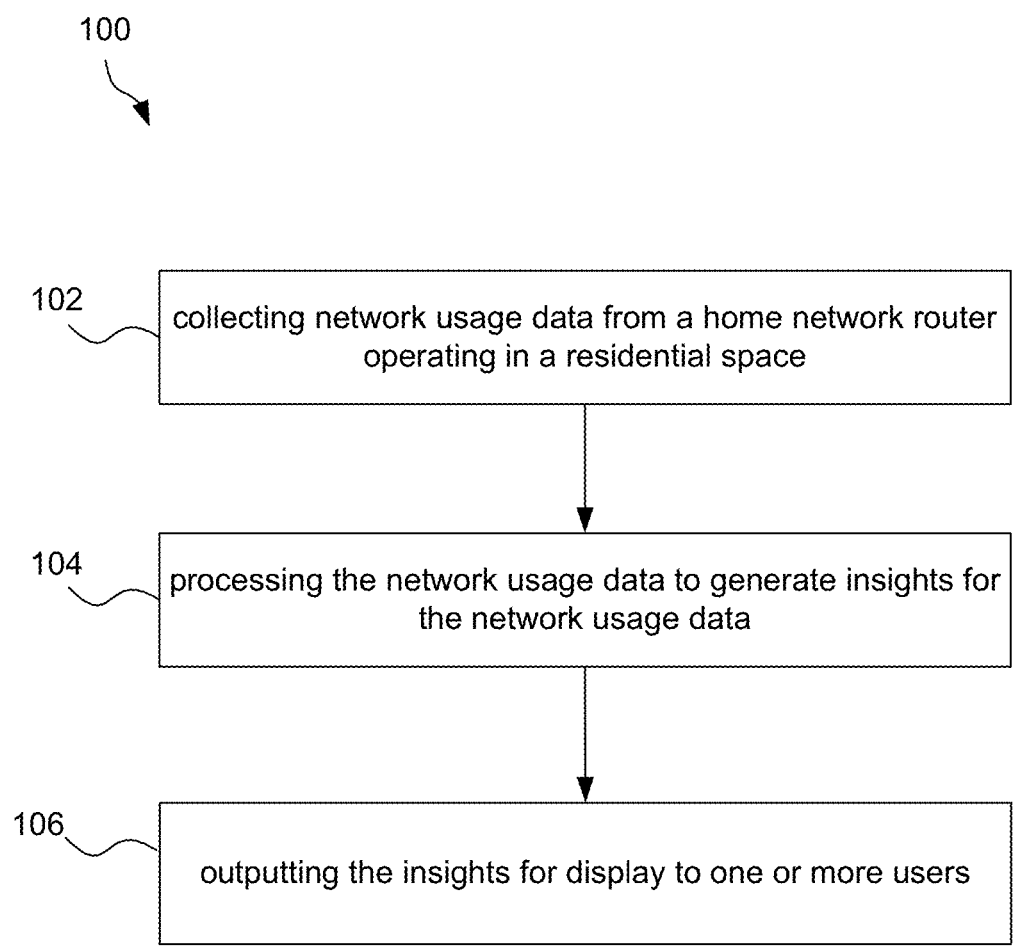
FIG. 1 illustrates a method for generating insights from home network router data, in accordance with one embodiment.

FIG. 1 illustrates a method 100 for generating insights from home network router data, in accordance with one embodiment. In one embodiment, the method 100 may be performed by a computer system (e.g. server) or group of computer systems, such as those described below with reference to FIGS. 5 and/or 6. For example, the method 100 may be performed by an insights platform executing as a cloud processing system in communication with the home network router via a network, as described in more detail with reference to the subsequent figures below.

As shown in operation 102, network usage and/or connection data is collected from a home network router operating in a residential space. The residential space may be a house, apartment unit or other residential unit or structure used principally for residential purposes by a substantially unchanging group of people. The home network router is any network router that enables communication between a network (e.g. the Internet) and user devices within and possibly around the residential space. Thus, the home network router may be located within the residential space, in one embodiment. The user devices may communicate with the home network router via a second network, such as a local area network (LAN).

As noted above, network usage and/or connection data is collected from the home network router. The network usage data may be data indicating instances of usage of the network by residents of the residential space, through use of the home network router, in one embodiment. The network connection data may be data indicating instances of connection to the home network router by residents of the residential space. For each of the instances of usage/connection, the network usage/connection data may include a time of the instance of usage/connection, a duration of the instance of usage/connection, an amount of the instance of usage/connection, a user device associated with (i.e. source of) the instance of usage/connection, a user account associated with the instance of usage/connection, or any other data describing the usage of/connection to the network.

In one embodiment, the home network router may be configured to communicate the network usage/connection data in real time for the real-time collection thereof. In another embodiment, the network usage/connection data may be collected by analyzing communications sent by the home network router in its normal course of use by the user devices. Of course, it should be noted that the network usage/connection data, which originated from the home network router, may be collected in any desired manner.

Additionally, as shown in operation 104, the network usage/connection data is processed to generate insights for the network usage/connection data. In one embodiment, the network usage/connection data may be processed by aggregating the network usage/connection data according to one or more parameters of the network usage/connection data (e.g. time of usage, source of usage, amount of usage, etc.) to generate insights showing an aggregation, summary, etc. of the network usage/connection data. In another embodiment, the network usage/connection data may be processed by a machine learning algorithm that infers the insights from the network usage/connection data, such as anomaly within the network usage/connection data. Of course, as an option, the insights may include a first portion generated from an aggregation function and a second portion generated from the machine learning algorithm.

Further, as shown in operation 106, the insights are output for display to one or more users. The users may be the residents of the residential space, in one embodiment. To this end, the residents causing the network usage/connection (e.g. from their user devices) may be able to view the insights generated from their network usage/connection. As an option, users may be restricted to only viewing insights generated from their own network usage/connection (i.e. network usage originated from their assigned user device). Of course, privileges to view the insights may be defined for the users in any desired manner.

Figure 4A:
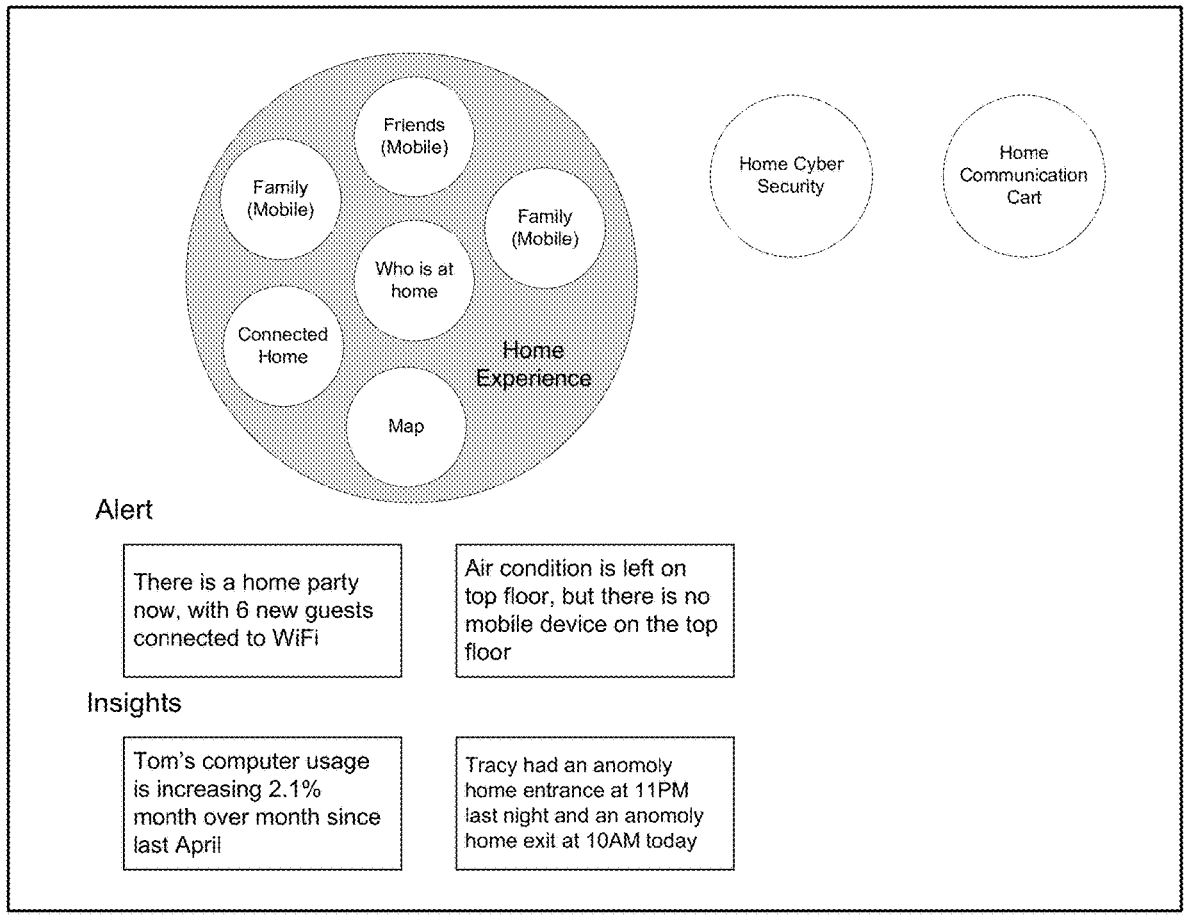
FIGS. 4A-C illustrates dashboards presenting insights generated from home network router data, in accordance with one embodiment.
Figure 4B:
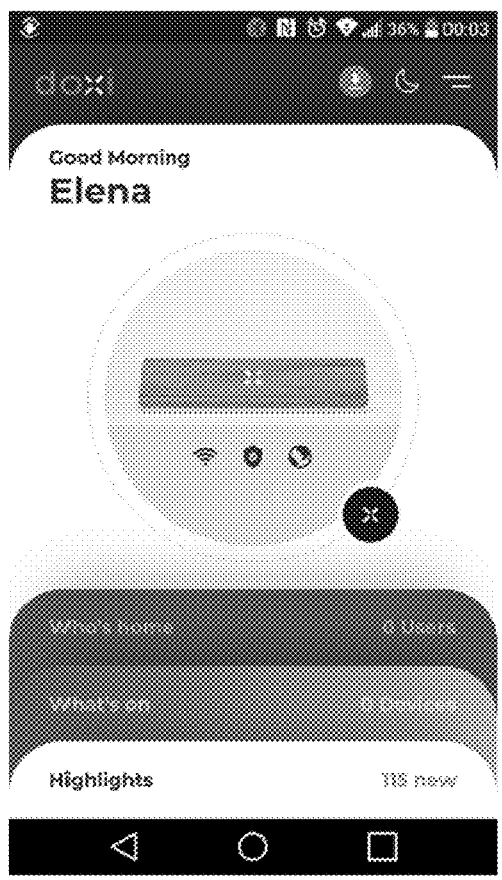
Figure 4C:
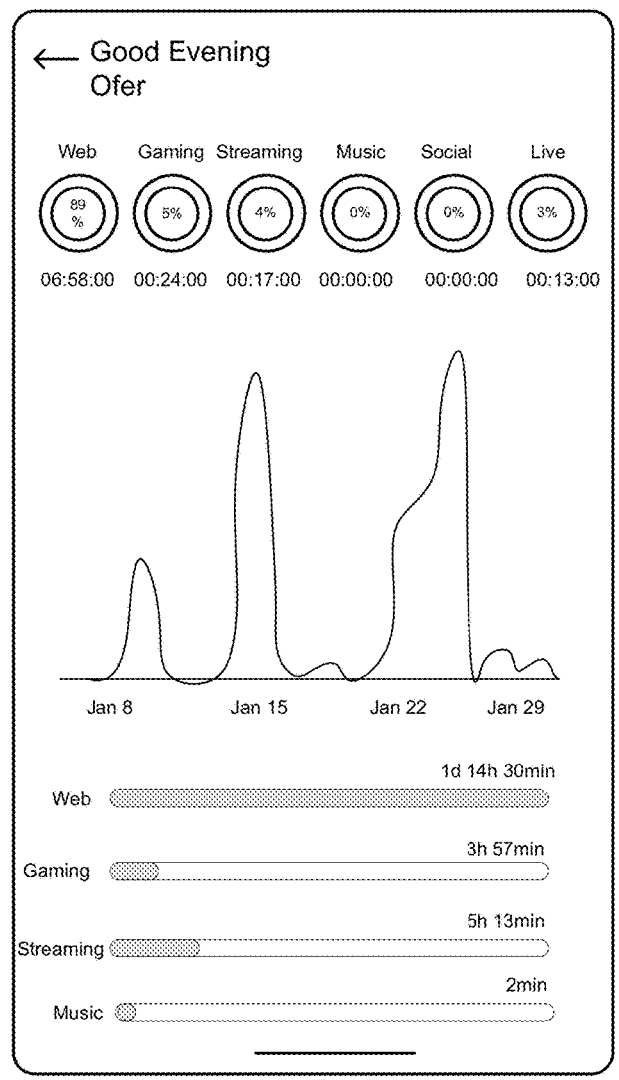

In another embodiment, the insights may be output in one or more dashboards. For example, different dashboards may present different portions of the insights. The dashboards may be web pages, as an option. As another option, the dashboards may be provided within an app. In yet another embodiment, the dashboards may be presented on the user devices of the users. Examples of the dashboards will be provided with reference to FIGS. 4A-C below.

To this end, the method 100 may take advantage of a router for service, in this case a home network router, that passes network usage/connection data such as time start and end of connection, connecting equipment identifier and type, throughput, and edge routing. This data, once collected, can be the basis for providing insights and related services.

The method 100 addresses home households with network connection, providing a view of the network data. The method 100 may provide both a direct view with built in visualizations of the network usage data, as well as machine learning based insights. For example, insights on network consumption per equipment and time of day may be viewed in a graph, and machine learning may provide alerts on anomalies.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

It should be noted that while network usage data is referenced throughout the embodiments described below, the embodiments may equally apply to network connection data.

Figure 2:
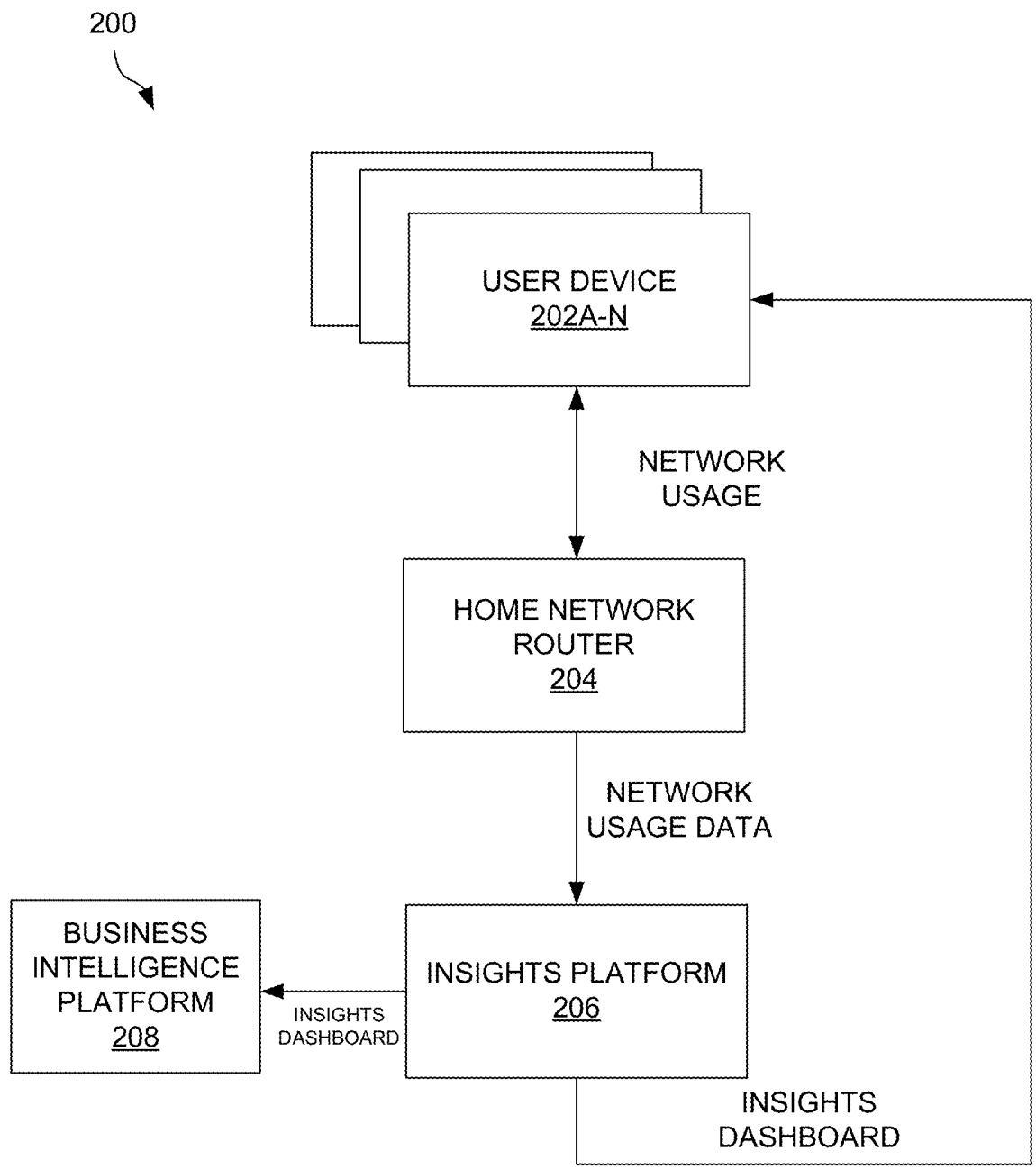
FIG. 2 illustrates a block diagram of a system for generating insights from home network router data, in accordance with one embodiment.

FIG. 2 illustrates a block diagram of a system 200 for generating insights from home network router data, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes at least one user device 202A-N that communicates with a home network router 204. The user device 202A-N may be any type of end user device capable of connecting to a network via the home network router 204. For example, the user device 202A-N may be a mobile phone, tablet, laptop computer, etc. In one embodiment, the user device 202A-N may communicate with the home network router 204 via another network, such as a LAN.

Additionally, the system 200 includes an insights platform 206 in communication with the home network router 204. The insights platform 206 may execute in the cloud, and thus remotely from the home network router 204, in one embodiment. In this embodiment, the insights platform 206 may communicate with the home network router 204 via the network to which the home network router 204 provides the user device 202A-N with access.

As shown, the user device 202A-N communicates with the home network router 204 to access (use) the network. In turn, network usage data related to the network use by the user device 202A-N is collected from the home network router 204 by the insights platform 206. The insights platform 206 processes the network usage data to generate insights, which are presented to the user device 202A-N via one or more insights dashboards and/or which are presented to a business intelligence platform 208 or users thereof via one or more business intelligence insights dashboards.

Figure 3:
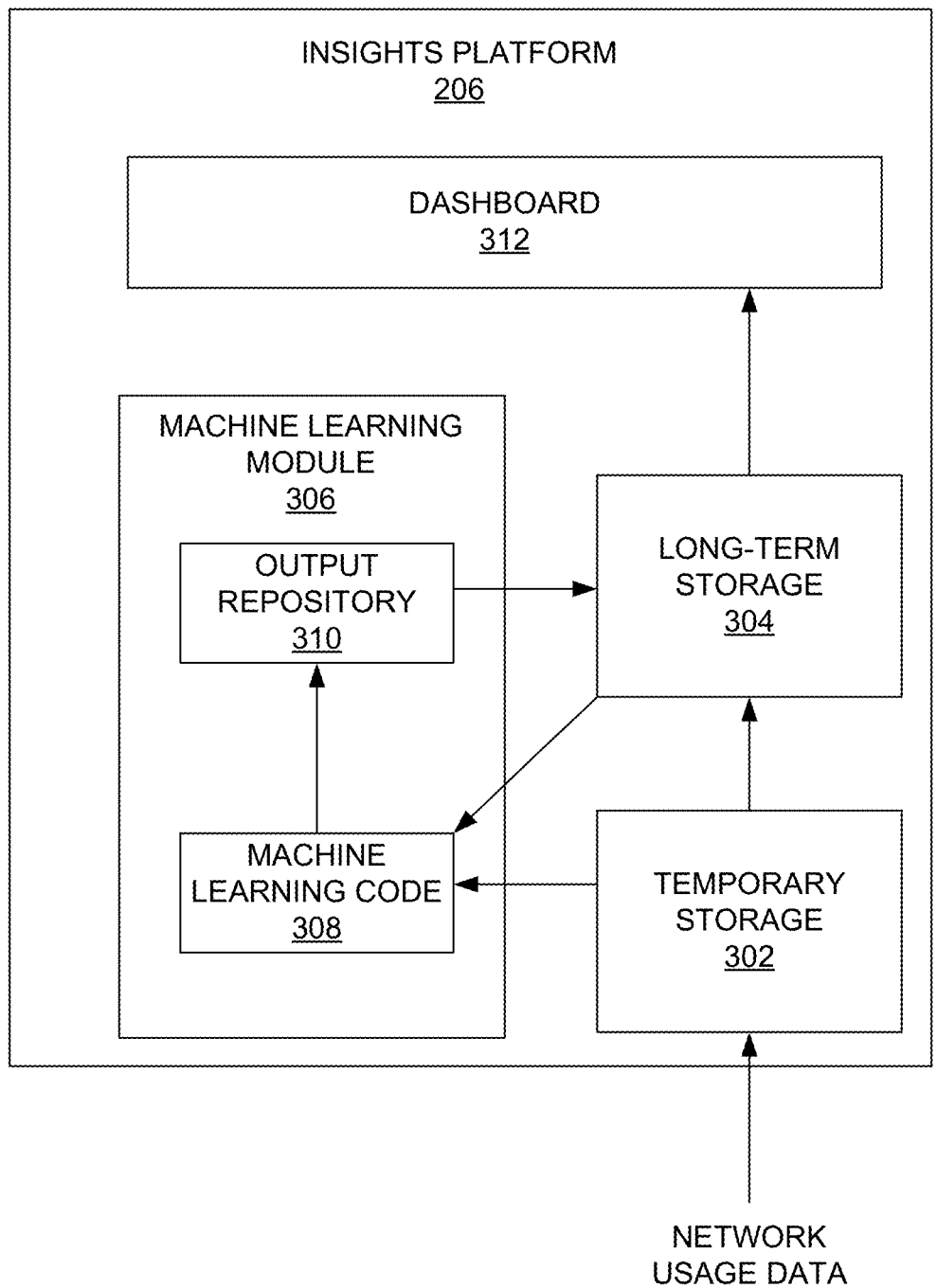
FIG. 3 illustrates the insights platform of FIG. 2 providing insights from home network router data, in accordance with one embodiment.

FIG. 3 illustrates the insights platform 206 of FIG. 2 providing insights from home network router data, in accordance with one embodiment. Thus, the insights platform 206 may be implemented in the context of the details of the previous figure and/or any subsequent figure(s). Of course, however, the insights platform 206 may be implemented in the context of any desired environment. Further, the aforementioned definitions may equally apply to the description below.

The insights platform 206 includes both real-time and batch layers. Insights are generated in batch as well as real time, and in the cloud. The input to the insights platform 206 is network usage data collected from the home network router, and the output is the insights presented to one or more users. To this end, the insights platform 206 may be used to provide a user with actionable insights, based on the home network router information. The actionable insights may include any insights from which the user or a system can take action, such as modifying parental controls, guest network access management, etc.

As shown, the network usage data collected from the home network router is stored in a temporary storage 302 of the insights platform 206. As an option, a router data queue (not shown) may be provided within the insights platform 300 to receive all data from the home network router in real time, and transfers this data to the temporary storage 302. The temporary storage 302 may get the network usage data from the home network router in near real time. The network usage data is stored in this repository temporarily for a defined period of time (e.g. for last 24 hours). The network usage data may include all details of the home network router activity, such as information about the connected user devices such as the device with its definitions and its performance, and the traffic events, time and frequency, loads up and down, throughput, packets, usage, connections/disconnections data, errors, and so forth.

The temporary storage 302 populates a long term storage 304 and machine learning code 308 of a machine learning module 306. The long term storage 304 gets the network usage data from the temporary storage 302 as a scheduled batch (e.g. every 1 hour). Thus, the network usage data may be transferred from the temporary storage 302 to the long term storage 304. As described below, the machine learning code 308 infers insights from data in both the temporary storage 302 and the long term storage 304. Once the inference is completed, the data in the temporary storage 302 is no longer needed for generating the insights, but instead only the inferred data is needed for populating the dashboard 312 and or performing further inferencing.

The network usage data is stored in this repository for a longer period of time (e.g. for 13 months). The network usage data may be stored in the long term storage 304 as aggregations and summaries of the home network router activity, along with selected time stamps. For example, the network usage data may be stored as average throughput per equipment per hour, and exact time stamp of equipment connect and disconnect. In one embodiment, the long term storage 304 may be the only source to populate the dashboard 312.

In another embodiment (not shown), the dashboard may also be populated from the temporary storage 302, especially where the temporary storage 302 stores weekly data where the dashboard 312 can drill down into data of the last week. In this way, the user may be presented with insights that recently occurred, and the user may be able to understand the details behind an alert and the latest detailed trend (where there are insights in the monthly graph and there are insights in the weekly detailed data). In addition, the insights from the detailed temporary storage 302 may be stored and accessible to the user, so the user can see aggregations and trends in a weekly basis (but not the originating detailed data).

The machine learning code 308 is a machine learning algorithm, such as a neural network. The inputs and outputs are located on the insights platform 206. The machine learning code 308 may be executed by the insights platform 206 in two or ore scheduler frequencies: high (e.g. every 5 min) and low (e.g. hourly).

High frequency models of the machine learning code 308 get data from the temporary storage 302 in a high frequency scheduled batch (e.g. every minute). The high frequency models produce alerts. For example, the alerts may be for an anomaly in the network usage data, such as an anomaly in the time at which a user device connected to the home network router. The alert type, message and timestamp may be stored into the long term storage 304, for example via an output repository 310 of the machine learning module 306. Of course, as another option some or all alerts may also be stored in the temporary storage 302.

Low frequency models of the machine learning code 308 get aggregated and time-stamped data from the long term storage 304 in low frequency scheduled batches (e.g. hourly or daily). The low frequency models produce patterns of behavior over long periods of time. The patterns include expected normal behavior that will feed the high frequency models, as well as insight messages. The insight message type, message text, variables and timestamp are stored into the long term storage 304, for example via the output repository 310 of the machine learning module 306.

As a further option (not shown), the insights platform 206 may also be used to compare one user of the residential space with other users of other residential spaces. This may be accomplished by the insights platform 206 being utilized for different residential spaces, such that the insights generated for the different residential spaces can be compared anonymously with others in the same city or similar household (e.g. defined by another machine learning algorithm to find similar users).

The dashboard 312 may correspond specifically to the home network router and can be viewed by a user (such as the household administrator) by any user device, for example from the insights platform 206 on a dedicated application or web dashboard. All dashboard reports may show data from the long term storage 304. This may include visualizations (graphs and charts) from the aggregations/ summaries as well as textual insights generated from the machine learning module 306.

The dashboard 312 may include a vast set of predefined reports. These reports may be accessed through a dashboard 312 menu, dashboard 312 textual alerts icon, dashboard 312 textual insights icon, dashboard 312 favorite reports icon, and/or dashboard 312 recommended reports icon. See for example FIG. 4A.

The menu for the home network router dashboard 312 may include multiple dashboard views such as:

1) A "summary page" showing the home services for the user (e.g. web, gaming, streaming, music), connected devices on the network of the user, performance of the network (e.g. download, upload) and periodical usage according to different types of activity.

2) "Who's home" detailing who are the users connected to the network, along with their associated user device, its type and their recent network usage events. See for example FIG. 4B. This dashboard may allow for an interactive definition of a user, also allowing overriding machine learning output (conclusions) about the user-device association.

3) "What's on" detailing which user devices are connected to the network, their type, consumption and usage information over a period of time (daily or hourly). See for example FIG. 4B.

4) "Highlights" detailing notifications according to the relevant topic such as parental control, usage, or the household. Highlighted notifications may also be presented by time. See for example FIG. 4B.

5) Display of data collection per home network router, user and user device showing usage and most active hours statistics according to activity type (such as web, gaming, streaming, music etc) to the household user. See for example FIG. 4C.

Dashboard 312 textual alerts may be created in high frequency by the machine learning module 306, based on execution with the temporary storage 302. The alerts text is stored in the long term storage 304. Per alert type, a specific dashboard is opened per user drill.

Dashboard 312 textual insights may be created in low frequency by the machine learning module 306, based on execution with long term storage 304, including a history of alerts. The textual insights are stored in the long term storage 304. Per insight type, a specific dashboard may be opened per user drilldown.

Favorite reports are the top report types visited and scored by the user, where the user has an option to score each dashboard report that he opens. Favorite alerts or discarded alerts management may also be provided, allowing the user to feedback what interests him and what doesn't.

Recommended reports are reports that are recommended to this user, by a machine learning recommender solution that is based on all user alerts and the user's favorite reports.

There may be a further option to publish insights to the service provider (i.e. network operator) or to a service provider forum for questions and answers (e.g. to get suggestions from the operator/helpdesk/peers with regards to improving the insights).

Figure 5:
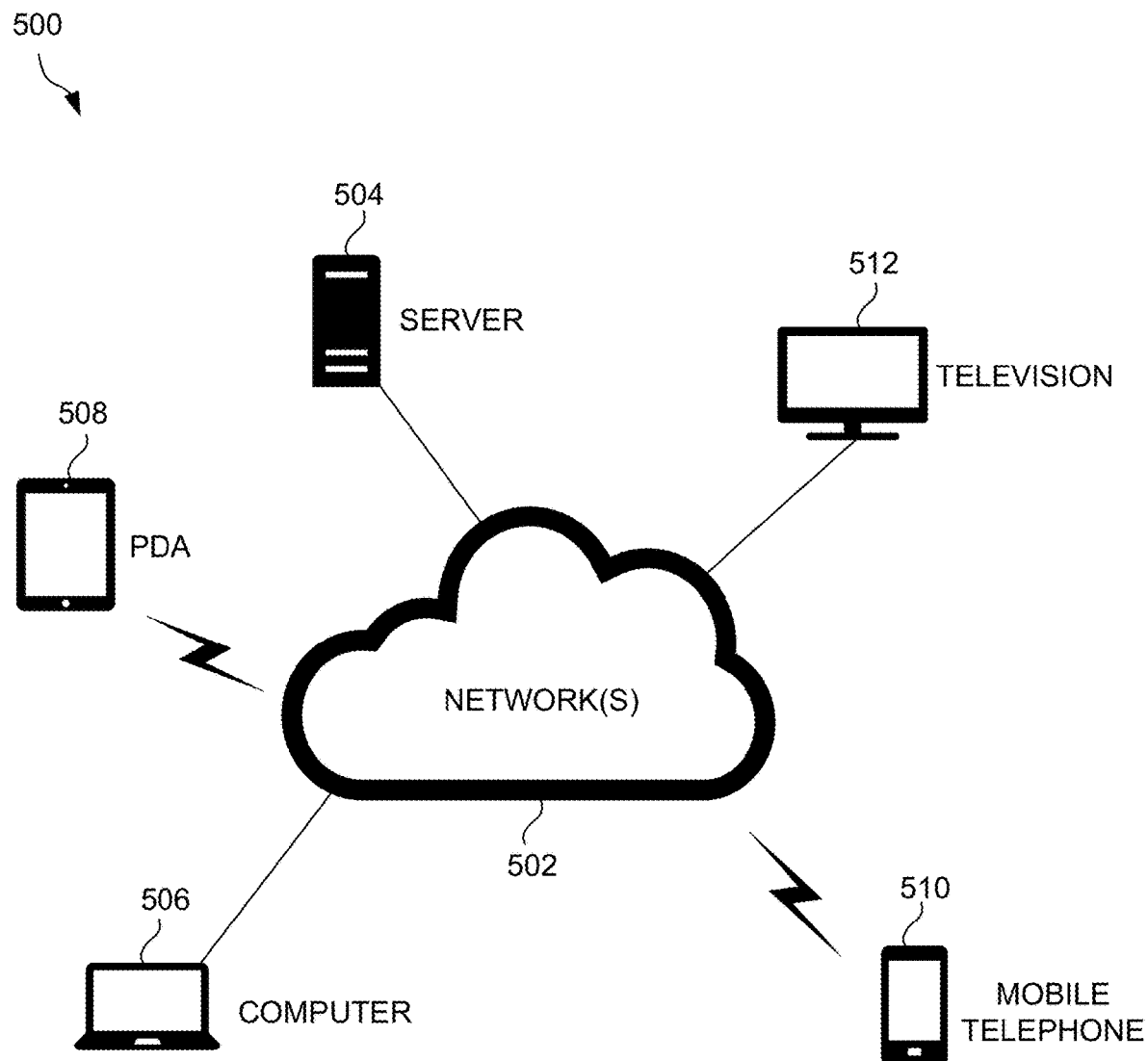
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
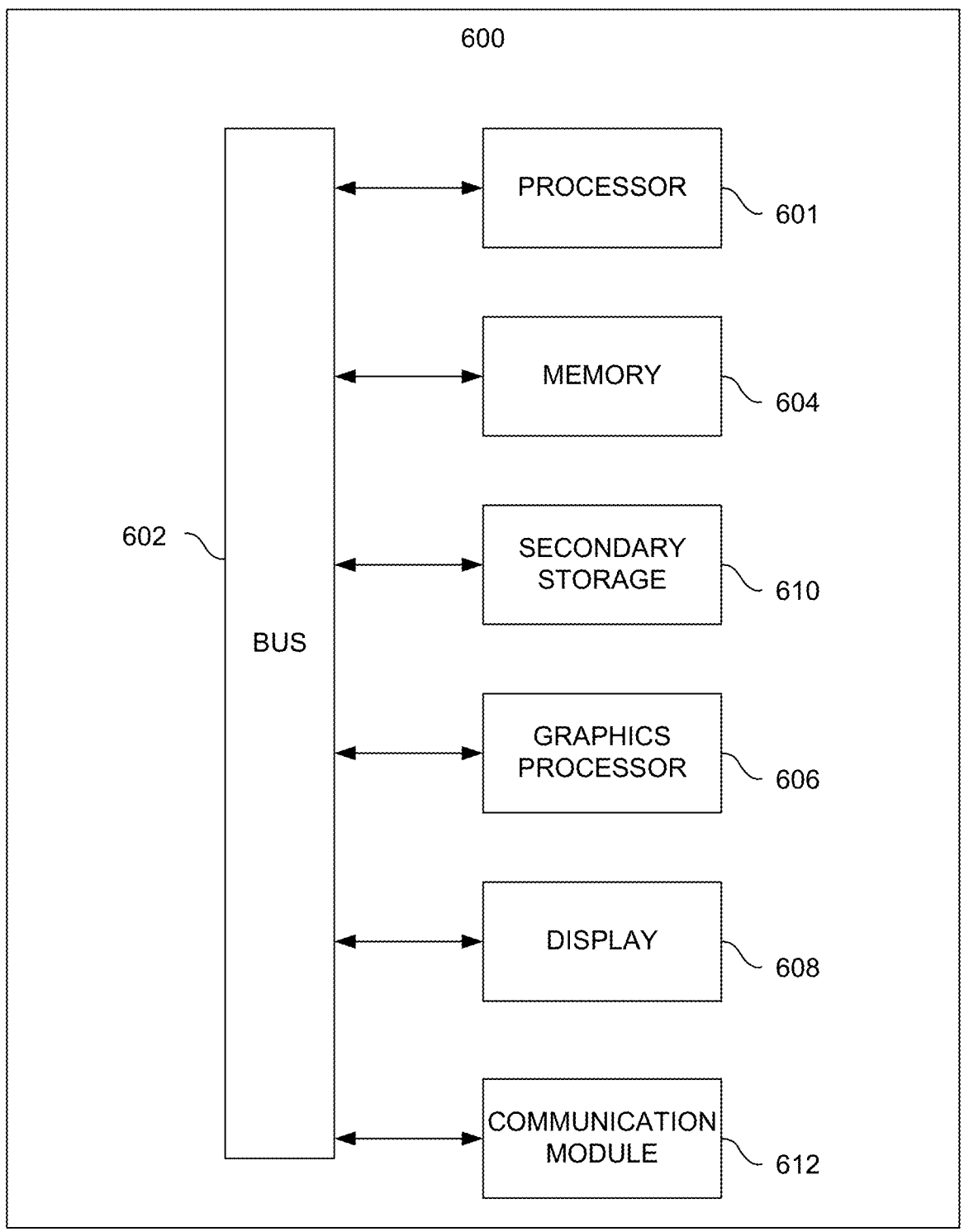
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
    collecting, from a home network router operating in a residential space and connected to a network, information indicating at least one of usage of the network by one or more devices through the home network router or connection to the home network router by the one or more devices;
    processing the information to generate insights for the home network router; and
    outputting, in at least one user interface, the insights for display to one or more residents of the residential space, wherein the insights are actionable insights from which the one or more residents can take action, the action including at least one of:
    modifying parental controls, or
    managing guest access.

2. The non-transitory computer readable medium of claim 1, wherein the usage of the network includes instances of the usage of the network by residents of the residential space.

3. The non-transitory computer readable medium of claim 2, wherein for each of the instances of usage, the information includes at least one of a time of the instance of usage, a duration of the instance of usage, an amount of the instance of usage, a user device of the one or more devices associated with the instance of usage, or a user account associated with the instance of usage.

4. The non-transitory computer readable medium of claim 1, wherein the information is collected in real-time.

5. The non-transitory computer readable medium of claim 1, further comprising:
    storing the information.

6. The non-transitory computer readable medium of claim 5, wherein the information collected from the home network router is temporarily stored in a first repository for a defined period of time.

7. The non-transitory computer readable medium of claim 6, wherein the information is transferred from the first repository to a second repository for long-term storage.

8. The non-transitory computer readable medium of claim 7, wherein the information is transferred as a batch from the first repository to the second repository.

9. The non-transitory computer readable medium of claim 7, wherein a first subset of the insights are generated from information stored in the first repository, and wherein the first subset of the insights are stored in the second repository.

10. The non-transitory computer readable medium of claim 9, wherein a second subset of the insights are generated from the information stored in the second repository, and wherein the second subset of the insights are stored in the second repository.

11. The non-transitory computer readable medium of claim 10, wherein the first subset of the insights and the second subset of the insights are output from the second repository for display to the one or more users.

12. The non-transitory computer readable medium of claim 1, wherein the information is processed by a machine learning algorithm to generate a first portion of the insights.

13. The non-transitory computer readable medium of claim 12, wherein the first portion of the insights indicate anomalies in the at least one of usage of the network by the one or more devices through the home network router or connection to the home network router by the one or more devices.

14. The non-transitory computer readable medium of claim 12, wherein the information is processed by an aggregation function to generate a second portion of the insights.

15. The non-transitory computer readable medium of claim 1, wherein the insights are output in one or more dashboards for the home network router displayed to the one or more residents of the residential space, the one or more dashboards including at least one of:
    a first dashboard showing home services, connected devices on the network, performance of the network, and usage per activity type.

16. The non-transitory computer readable medium of claim 1, wherein the actionable insights are usable by at least one of the one or more residents or a system for taking action based on the insights.

17. The non-transitory computer readable medium of claim 1, wherein the collecting, processing, and outputting are performed by a cloud processing system in communication with the home network router via the network.

18. A method, comprising:
    collecting, from a home network router operating in a residential space and connected to a network, information indicating at least one of usage of the network by one or more devices through the home network router or connection to the home network router by the one or more devices;
    processing the information to generate insights for the home network router; and
    outputting, in at least one user interface, the insights for display to one or more residents of the residential space, wherein the insights are actionable insights from which the one or more residents can take action, the action including at least one of:
    modifying parental controls, or
    managing guest access.

19. A system, comprising:
    a non-transitory memory storing instructions; and
    one or more processors in communication with the non-transitory memory that execute the instructions to perform a method comprising:
    collecting, from a home network router operating in a residential space and connected to a network, information indicating at least one of usage of the network by one or more devices through the home network router or connection to the home network router by the one or more devices;
    processing the information to generate insights for the home network router; and outputting, in at least one user interface, the insights for display to one or more residents of the residential space, wherein the insights are actionable insights from which the one or more residents can take action, the action including at least one of:

modifying parental controls, or managing guest access.

20. The system of claim 19, wherein the system is a cloud processing system in communication with the home network router via the network.

\* \* \* \* \*